April 23, 1946.   D. G. C. HARE   2,398,934
RADIATION DETECTOR
Original Filed Sept. 27, 1941

D. G. C. HARE
INVENTOR

BY
HIS ATTORNEY

Patented Apr. 23, 1946

2,398,934

UNITED STATES PATENT OFFICE 2,398,934

RADIATION DETECTOR

Donald G. C. Hare, Roslyn, N. Y., assignor to The Texas Company, New York, N. Y., a corporation of Delaware Original application September 27, 1941, Serial No. 412,617. Divided and this application March 18, 1943, Serial No. 479,552

6 Claims. (Cl. 250—83.6)

This invention relates to the detecting and measurement of penetrative radiation and more particularly to a device of the Geiger-Muller counter type for measuring the intensity of such radiation as gamma rays.

This is a division of my copending application, Serial No. 412,617, filed September 27, 1941, for a Radiation detector.

The principal object of the invention is to provide a device of this type which will have an efficiency much higher than the ordinary or conventional Geiger-Muller counter, which will be relatively simple to manufacture and which will be sufficiently rugged to enable it to be used in comparatively rough service such, for instance, as in the logging of wells or bore holes.

In the copending patent application of myself and another filed November 2, 1940, Serial No. 364,020, there is disclosed a device for the detecting of penetrating radiation such as gamma rays, which device has an efficiency many times that of the devices known to the prior art. The present invention relates to a device of this type having the advantages of high efficiency and stable operation of the device of the aforementioned copending application and also other advantages not inherent in the device disclosed in that application. Of particular value is the simplification of construction and an increased ruggedness resulting from much larger permissible manufacturing tolerances.

In accordance with the invention, a radiation detecting device is formed preferably of one or more cathode plates, in the surface of which one or more holes have been formed to allow the passage of fine anode wires in a direction which may be substantially perpendicular to the plane of the plates. If a plurality of plates are used, they may be arranged substantially parallel to each other and separated a relatively small distance, and in this case the plates are so oriented that the holes of the plates are in alignment so that an anode wire can be disposed substantially through the center of each series of holes. The device comprising the cathode and the anode is housed in an envelope of glass, metal or other suitable material, the envelope being preferably filled with a suitable gas. In one embodiment of the invention the anode wire is disposed within a thin-walled metallic tube which is passed through the holes in electrically non-conducting cathode plates.

For a better understanding of the invention reference may be had to the accompanying drawing in which Fig. 1 is a diagrammatic view of a Geiger-Muller counter of the conventional type;

Figure 1:
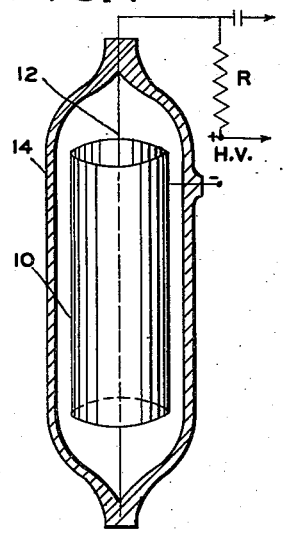

The conventional Geiger-Muller counter shown in Fig. 1 consists of a thin-walled metal tube 10 with a very thin wire, comprising the anode 12, spanned axially and insulated from the metal tube forming the cathode. These electrodes are enclosed in an envelope 14, commonly a glass tube, which contains a suitable gas, e. g. argon, at a fairly low pressure, say 5-10 cm. of mercury. The central wire 12 is maintained at a positive potential with respect to the cylinder, and a fairly high resistance R is placed in the circuit. Normally the potential difference between the cathode 10 and wire 12 is nearly but not quite high enough to cause a discharge to take place. If a particle capable of ionizing the gas passes through the cylinder 10, a discharge will take place with a current flow of the order of a few microamperes. This causes a large voltage drop across R and the discharge will cease after a very short period of time. By suitably amplifying the sudden voltage drop across R, a mechanical recorder or other device capable of registering the discharge of the counter may be actuated. Suitable treatment of the surface of the cylinder 10 and proper choice of the gas or gases filling the counter will cause the discharge to stop more quickly and reliably. After the discharge has ceased, the counter is again in a condition to register the passage of an ionizing particle.

Because of the large ionization per unit path length of such radiation as cosmic or beta rays, even in the relatively low density of the gas in the counter, the efficiency of the conventional counter for such rays is very nearly 100%. However, the probability of a gamma ray causing ionization in the gas is almost vanishingly small, and practically all the counts due to the passage of gamma rays are due to the electrons ejected from the cathode wall 10 by the interaction of the gamma ray with the atoms of the cathode material. The probability of such an interaction taking place will, of course, increase with increasing cathode-wall thickness, but since the range in the cathode material of an electron receiving energy from the gamma ray is seldom greater than one- or two-tenths of a millimeter, nothing is to be gained by making the wall 10 thicker than about twice the average range of the particles. At this thickness about one out of every one hundred gamma rays traversing the cathode will eject an electron so as to "trigger" or discharge the counter. This probability or efficiency is somewhat dependent on the material used as the cathode 10 and on the amount of surface exposed, but all these factors will not cause any variation of efficiency by more than a factor of about two from that of a simple counter with the optimum wall thickness. It is to be pointed out that the efficiency is practically independent of the size of the counter, a very small counter having nearly the same optimum efficiency as a very large one.

I define the efficiency of a counter as the ratio of the number of counts to the number of rays traversing the cathode area. For a parallel beam of gamma rays one can, of course, increase this ratio by using several counters, one behind the other and connected in parallel. If I have N counters, each with an efficiency E, the efficiency of the combination would be nearly NE. However, a parallel beam of gamma rays is a practical impossibility and does not occur in nature.

Figure 2:
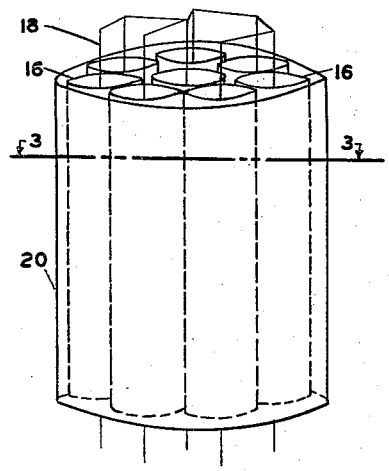
Fig. 2 shows one arrangement of a group of conventional counters and Fig. 3 is a sectional view on line 3—3 of Fig. 2.
Figure 3:
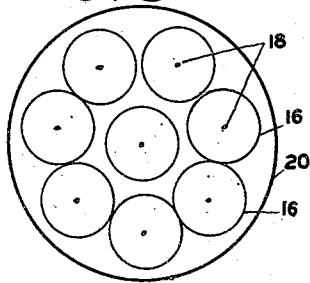

Another obvious way of obtaining a higher efficiency in a given counter volume is to replace the single large counter with a bundle of small counters which may be arranged as shown in Figs. 2 and 3. These figures show a bundle of eight small counters having cathodes 16 and anodes 18 arranged within an envelope 20. The cylinders 16 are connected together electrically to form the cathode, while the wires 18 are connected electrically to form the anode. However, unless the lateral cross-section of the available counter volume is very large it is not possible to get a very large gain in efficiency unless one uses a large number of very small counters. For example, if I have a lateral cross-section 3 inches in diameter, I could use seven 1-inch counters which would give me an increase in efficiency by a factor of seven-thirds. In order to get an increase in efficiency by a factor of ten it would be necessary to use over 120 counters, each one smaller than one-quarter inch in diameter. It is extremely difficult to secure the necessary uniformity of operation with such a large number of thin-walled tubes and the difficulties encountered will quite obviously increase rapidly with the length of the counter.

In Figures 2 through 5 the housing or envelope has been omitted in order to simplify the drawing. It is understood that each of the devices shown in these figures will be housed in a suitable casing or glass envelope which may be similar to the envelope 14 of Fig. 1.

Figure 4:
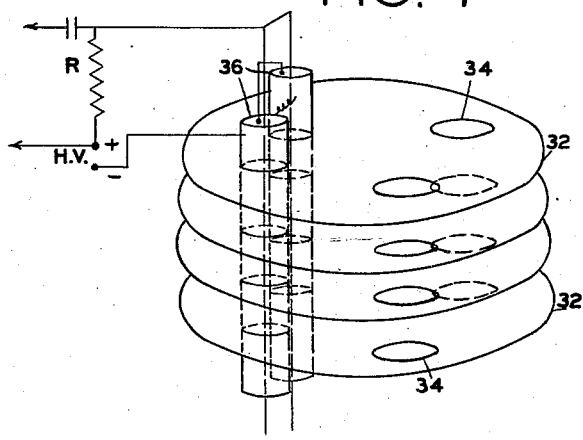
Fig. 4 is a diagrammatic representation of another form of the invention.

For certain conditions of plate spacing or where for various reasons it may be desirable to make the cathode plates of non-conducting materials, the embodiment of the invention shown in Fig. 4 may be used. The counter consists of a plurality of electrically non-conducting plates 32 in which holes 34 have been made and through which holes have been placed very thin-walled electrically conducting cathode tubes, two of which are shown at 36. The walls of these tubes are thin enough, i. e., a small fraction of a millimeter, to allow the passage of electrons ejected from the plates 32 by the gamma rays with little loss of energy. The function of these tubes 36 is primarily to produce a suitable electric field, nearly all the ejected electrons coming from the plates through which the tubes have been passed.

Figure 5:
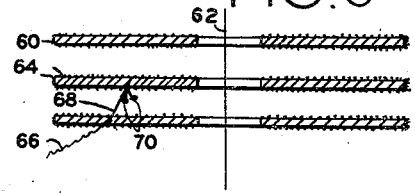
Fig. 5 is a diagrammatic view illustrating a modification in which the plates are coated with a photo-sensitive material.

It has been found that the efficiency of a multiple plate detector can be increased by providing a photosensitive surface on the cathode plates. In Fig. 5 a simple detector is illustrated as having three metallic cathode plates 60 and one anode wire 62. The surfaces of the cathode plates are covered with a photosensitive material 64. A gamma ray 66 shown as penetrating the bottom plate 60 may cause a primary electron 68 to be ejected in such a direction that the electron might enter the middle cathode plate 60 and stop and without causing ionization of the gas within the counter. However, when the primary electron 68 strikes the photosensitive surface 64, a plurality of secondary electrons 70 will be produced with a good possibility that one of the electrons will cause ionization to trip the counter.

For certain applications, such as the well logging method disclosed in my copending application, Serial Number 337,862, it may be desirable to detect radiation which itself is ordinarily non-ionizing, such as slow neutrons. This is commonly done by using a counter whose cathode is of a material which disintegrates or becomes radioactive under slow neutron bombardment with consequent emission of ionizing particles. Such a substance is boron, which commonly occurs in the form of borax. It is believed obvious that the counter herein described may be applied to this use by using plates of suitable material, or by coating the plates with a suitable substance such as a lithium or boron compound. It is to be pointed out that if the conventional counter cathode is thus coated, serious difficulties of operation may ensue, particularly if the coating is a non-conductor, or is not smooth. In the case of the new counter herein described, the active field is confined to a very small region about the holes, and thus any type of material or coating outside this area will not affect its operation. If desired, these counters can be operated at a voltage somewhat lower than the normal threshold and will then respond in a manner proportional to the ionization produced by the particle passing through the sensitive region. This allows the detection of, say, alpha particles ejected by the disintegration produced by slow neutrons, even in the presence of a large gamma-ray background, since an alpha particle will cause a very much greater ionization than will the beta particles due to the gamma rays.

Obviously many modifications and variations of the invention, as hereinbefore set forth, may be made without departing from the spirit and scope thereof and, therefore, only such limitations should be imposed as are indicated in the appended claims.

I claim:

1. A device for detecting gamma radiation comprising a cylindrical cathode member, an anode member formed by a wire passing axially through said cylindrical member, and a plurality of separated plates extending laterally and externally of said cylindrical member.

2. A device for detecting gamma radiation comprising a cylindrical, metallic cathode member, an anode member formed of a wire passing axially through said cylindrical member, and a plurality of separated, substantially parallel plates of non-metallic material extending laterally around the exterior of said cylindrical member.

3. A device for detecting gamma radiation comprising an envelope, a cathode member in said envelope comprising a plurality of separated, parallel plates, said plates being provided with holes arranged in a plurality of parallel lines, a thin-walled metal tube extending through each line of holes, said tubes being connected together electrically to form a cathode, and an anode wire extending through the center of each tube.

4. A device for detecting gamma radiation comprising an envelope, a member in said envelope comprising a plurality of separated, substantially parallel plates of non-conducting material, said plates being provided with holes arranged in a plurality of parallel lines, a thin-walled metallic tube extending through each line of holes, said tubes being connected together electrically to form a cathode, and a wire extending through the center of each tube, said wires being connected together electrically to form an anode.

5. A device for detecting gamma radiation comprising a plurality of separated plates connected together electrically to form a cathode, each of said plates being provided with photosensitive surfaces and at least one hole, and an anode wire extending through said holes.

6. A device for detecting gamma radiation comprising a housing containing an ionizable gas, a plurality of separated substantially parallel plates in said housing, said plates being connected together electrically to form a cathode and provided with photosensitive surfaces and a plurality of series of aligned holes, and a wire extending through each series of holes, said wires being connected together electrically to form an anode, the arrangement being such that a gamma ray entering said housing may penetrate one of said plates to eject a primary electron which will strike one of the photosensitive surfaces to produce a plurality of secondary electrons to ionize said gas.

DONALD G. C. HARE.